March 29, 1955

J. A. PRATT 2,705,278

PROJECTED SPOTLIGHT APPARATUS

Filed Sept. 16, 1952

INVENTOR
JAMES A. PRATT

BY *Robert B. Harmon*

ATTORNEY

March 29, 1955    J. A. PRATT    2,705,278
PROJECTED SPOTLIGHT APPARATUS
Filed Sept. 16, 1952    3 Sheets-Sheet 2
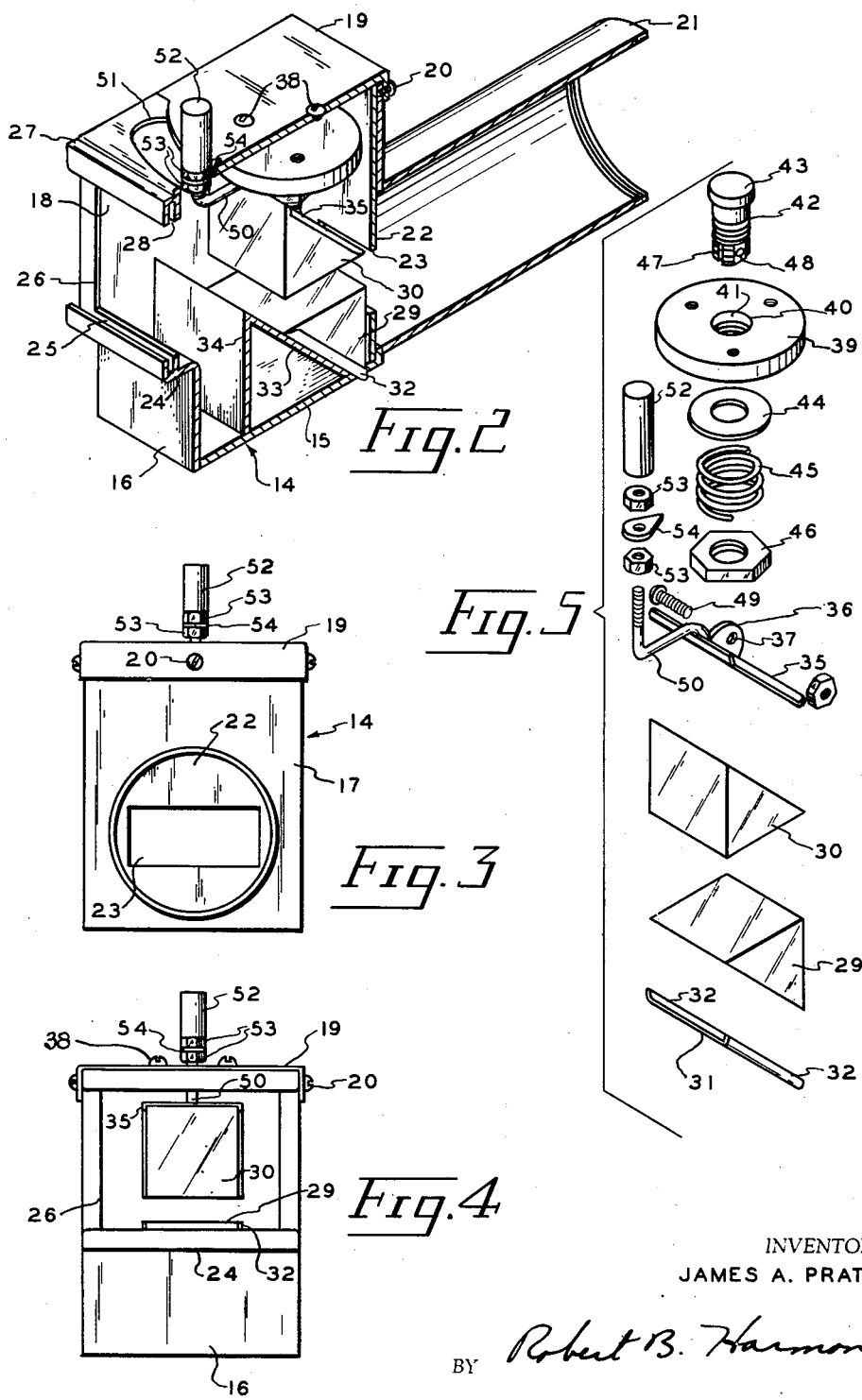
INVENTOR
JAMES A. PRATT
BY Robert B. Harmon
ATTORNEY March 29, 1955 J. A. PRATT 2,705,278
PROJECTED SPOTLIGHT APPARATUS
Filed Sept. 16, 1952 3 Sheets-Sheet 3
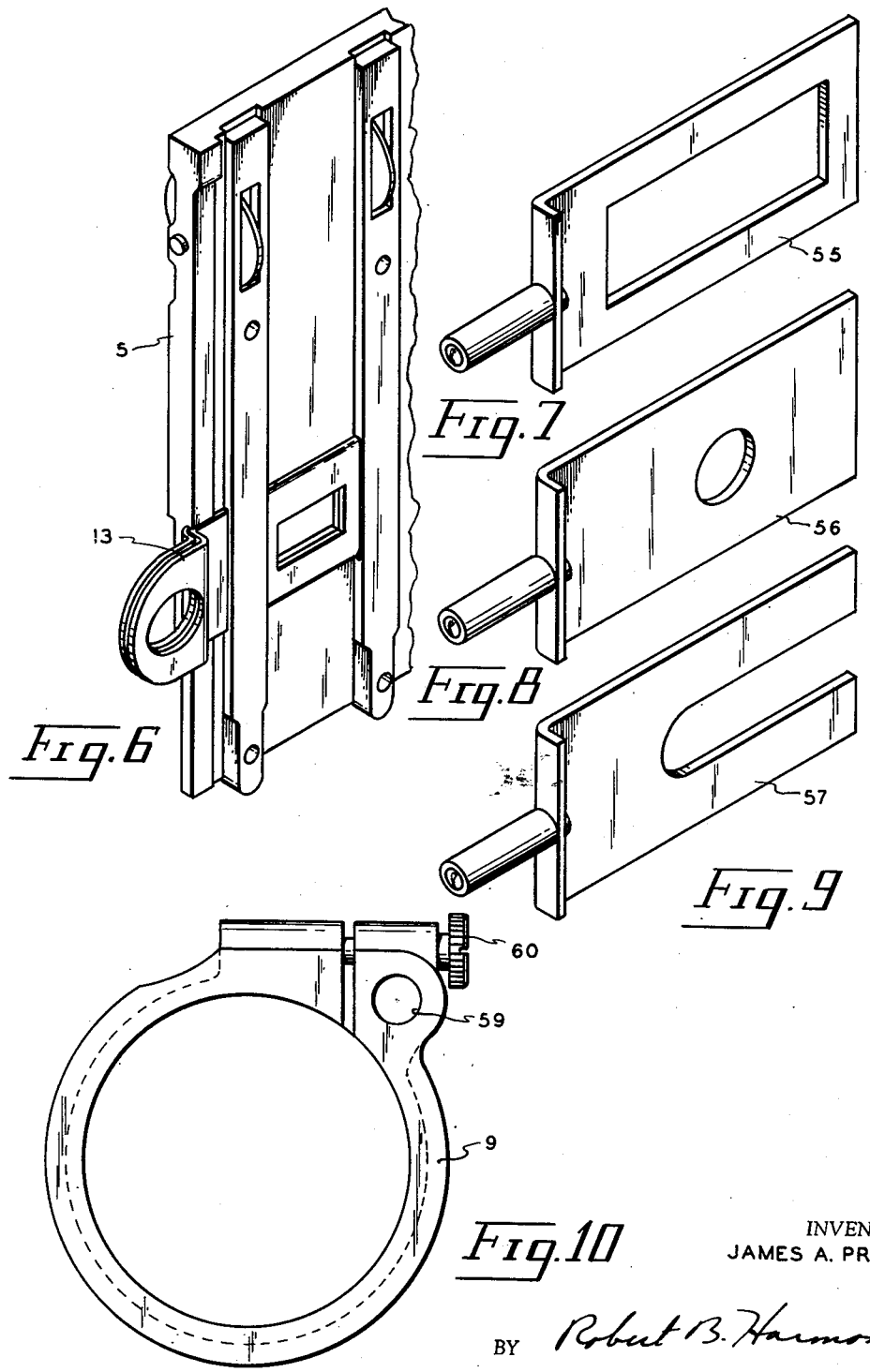
INVENTOR
JAMES A. PRATT
BY Robert B. Harmon
ATTORNEY

United States Patent Office 2,705,278
Patented Mar. 29, 1955

2,705,278

PROJECTED SPOTLIGHT APPARATUS

James A. Pratt, Washington, D. C.

Application September 16, 1952, Serial No. 309,817

5 Claims. (Cl. 240—3)

This invention relates generally to spotlights for theaters and more particularly to a spotlight attachment for a theater motion picture projection apparatus.

The primary object of the invention is to provide a spotlight attachment for motion picture projectors so that it will be unnecessary for theater owners to purchase, operate and maintain the expensive and cumbersome spotlight apparatus now in common use.

A more specific object of the invention is to provide a spotlight apparatus adapted to fit on to the lens assembly of a projector which will receive the light from the projector lamp and adjustably direct it to any desired portion of the forward part of the theater.

A further object of the invention is to provide a spotlight attachment for a motion picture projector which may be quickly applied and removed to the lens assembly of the projector without disturbing the focus thereof.

A still further object of the invention is to provide simplifier attachment mechanisms for modifying motion picture projectors to render them quickly convertible into adjustable spotlight projectors.

Another object of the invention is to provide a new and improved mechanism for casting a spotlight in arenas, theaters and the like.

A further object of the invention is to provide a new method of casting a spotlight in arenas, theaters and the like.

With the foregoing and other objects in view, the invention resides in the following specification and appended claims, certain embodiments and details of construction of which are shown in the accompanying drawings in which:

Figure 2 is a partially sectioned view of the spotlight attachment for a projector;

Figure 3 is a view in rear elevation of the spotlight attachment;

Figure 4 is a view in front elevation of the spotlight attachment;

Figure 5 is an exploded view of the parts making up the working components of the spotlight attachment;

Figure 6 is a view in elevation of the film trap portion of a motion picture projector;

Figures 7, 8 and 9 are views in elevation of typical aperture plates used to modify the amount of light passing through the film trap; and Figure 10 is a view in elevation of a clamping ring used to connect the spotlight attachment to the lens assembly of the motion picture projector.

Figure 1:
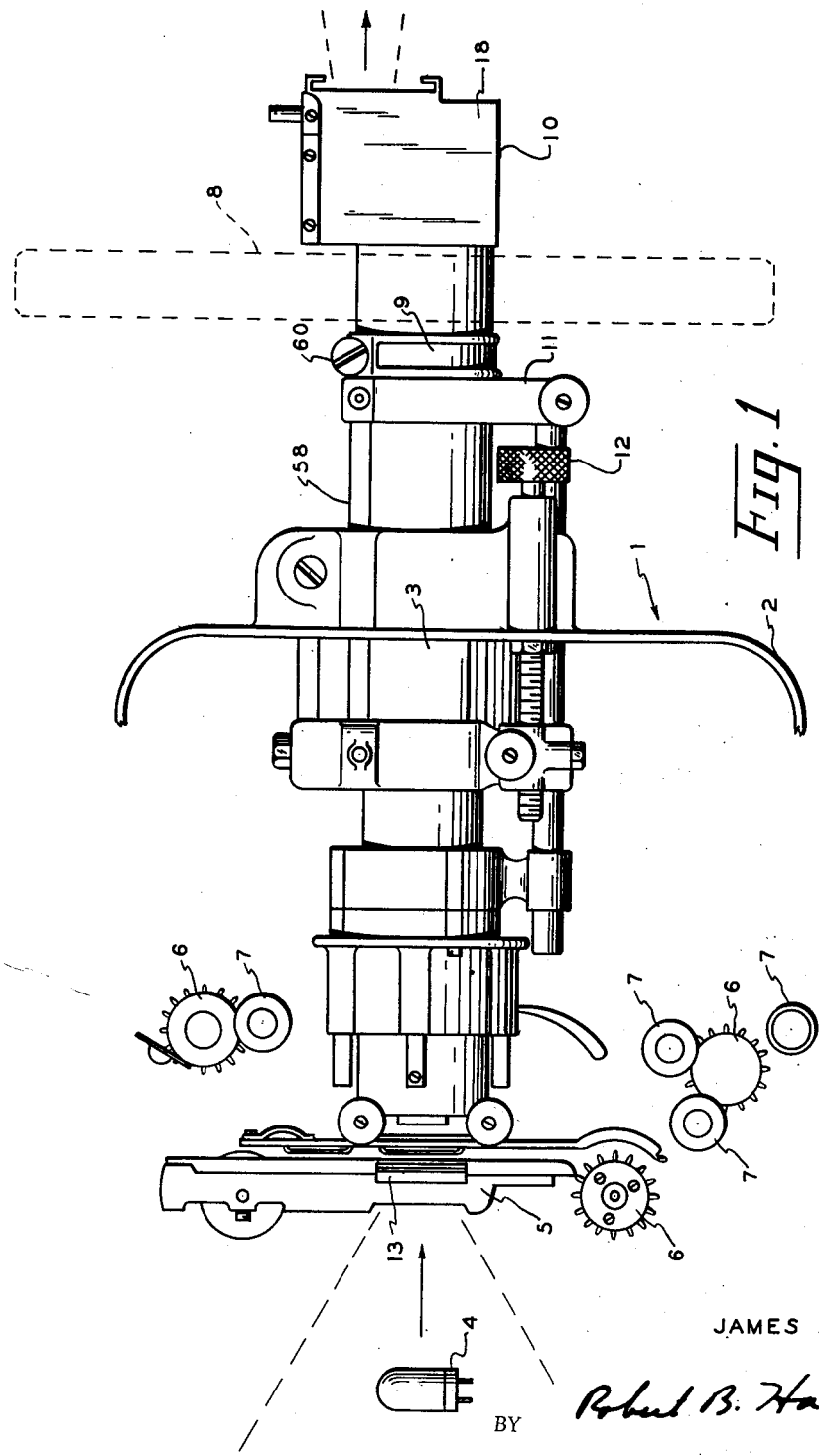
Figure 1 is a view in side elevation of a portion of a motion picture projector with the spotlight attachment applied thereto.

Attempts to successfully utilize a motion picture projector as a light source for casting a spotlight in theaters have been made in the past; for example, Patent No. 1,101,414 to Daley et al., Patent No. 1,750,020 to Nairn and Patent No. 1,738,944 to Brenkert. None of these patents, however, discloses any apparatus which is suitable for present day movie projectors. Nor do these patents disclose a system, method or apparatus for obtaining a spotlight of controllable size, focus and direction. The present invention, about to be described, is a decided improvement over the prior art in providing these desirable features in a simplified apparatus adaptable to the several types of commercial motion picture projectors now in general use.

While the invention is primarily intended for use with movie projectors, it is obvious that it is also suitable for use as a general spotlight apparatus separate and distinct from projectors.

Referring now to Figure 1, a motion picture projector is shown in part generally indicated at 1 having a frame 2, a lens assembly 3, a light 4, a film trap assembly 5, film drive sprockets 6, film holding idler rollers 7, and a rotary shutter mechanism in dotted lines at 8. Secured by a clamping ring 9 to the forward end of the lens assembly 3 is a spotlight attachment 10. The attachment is projected through a hole (not shown) in the standard shutter mechanism 8.

In order to avoid a disturbance of the focus of the projector lens, the focus adjustment ring 11 is not moved when connecting the attachment 10 to the lens assembly 3 by clamping ring 9. In this manner, if the projector is being used for displaying a film, there is no time delay for focusing purposes. The same holds true for the periods when it is desired to utilize the projector for projecting a spot of light in focus to a forward portion of the theater. Should a change in focus be desired, however, a simple adjustment of the focusing ring 11 by adjustment nut 12 may be made.

The film trap assembly 5 includes the standard light framing aperture plate 13. The path of the light derived from the projector light 4 is indicated by the arrows in Figure 1. The light beam proceeds from the light 4 through the framing aperture plate 13, through the lens assembly 3 and the spotlight attachment 10 to the desired portion of the theater. This beam of light is therefore framed, concentrated, focused and adjusted (by means to be described) before it leaves the projection room of the theater.

Referring now to Figures 2 to 5, inclusive, the spotlight attachment 10 is shown comprising a casing 14 which is generally of box-like construction. Welded or otherwise secured together are the bottom plates 15, the front plate 16, the rear plate 17 and the side plate 18. The cover plate 19 is secured to the front, side and rear plates by screws 20 to complete the casing 14. Secured by welding or other means to the rear plate 17 of the casing 14 is a tubular extension 21 for direct connecting by the clamping ring 9 to the lens assembly 3 of the projector 1.

Secured within the casing by suitable means, such as, welding, is a light screen 22, which is an opaque plate having a cutaway portion 23 therein. Although this screen 22 is shown as a separate member in the drawings, it may in part be the rear plate 17 of the casing 14.

The front plate 16 of casing 14, which may be formed by a stamping or die casting process, is provided with an offset portion 24 which includes a groove 25. The plate 16 is cutaway at 26 to provide a large light-projecting aperture. The upper end of plate 16 is also offset at 27 to provide an upper groove 28. The grooves 25 and 28 thus provided permit the insertion of color screens when a colored spotlight projection is desired.

The interior of the casing 14 is provided with a fixed prism 29 and an adjustable prism 30. The fixed prism is freely held in position in front of the cutaway portion 23 of screen 22 by a plate 31, which is provided with upstanding side and rear flanges 32, the rear flange not being apparent in the drawings. This plate 31 is welded or otherwise secured to the side 33 of a triangular shaped mounting frame 34 which is welded to the bottom plate 15 of the casing 14.

The upper prism 30 is carried by a clamping plate 35. Upstanding from the plate 35 is a hinge plate 36 having a hole 37 therethrough. Secured to the top plate 19 of the casing 14 by screws 38 is a plate 39. Plate 39 is provided with a bore 40 extending therethrough. The bore 40 is of two different diameters to provide a ledge 41 about halfway through the plate 39. Extending through the bore 40 is a bolt 42, the diameter of which is less than that of the bore. Bolt 42 has a head 43 which engages the ledge 41 of the bore 40 to thereby permit relative rotation of the bolt. A washer 44, a spring 45 and a nut 46 which fit about and thread on to a portion of the bolt extending below the plate 39 are utilized to adjust the freedom of rotation of the bolt 42 in the bore 40.

The lower end of bolt 42 is slotted at 47 to receive water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

Example 1

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

Example 2

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

Example 3

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

Example 4

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

Example 5

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

Example 6

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

Example 7

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

means in the horizontal plane about a vertical axis and in a vertical plane about a horizontal axis intersecting said vertical axis, and a handle connected to the adjustable reflector means and extending from said casing to control the movements of the adjustable reflector means and hence the vertical and lateral displacements of the light issuing from the casing.

5. A spotlight attachment for a motion picture projector including a light, a focusing lens assembly and a film trap with a light aperture plate between the light and the assembly comprising a casing, means to attach the casing directly to the lens assembly of the projector, fixed reflector means mounted within the casing to receive and reflect the focused light beam from the projector light, adjustable reflector means to receive the reflected light beam from said fixed reflector means and to adjustably direct the said light beam from the casing, mounting means for movably securing said adjustable reflector means to the casing, said mounting means permitting movement of said adjustable reflector means in the horizontal plane about a vertical axis and in a vertical plane about a horizontal axis, and a handle connected to the adjustable reflector means and extending from said casing to control the movements of the adjustable reflector means and hence the vertical and lateral displacements of the light issuing from the casing.

References Cited in the file of this patent

UNITED STATES PATENTS

| 1,089,080 | Rauschert | Mar. 3, 1914 |
| 1,101,414 | Daley et al. | June 23, 1914 |
| 1,750,020 | Nairn | Mar. 11, 1930 |
| 2,438,333 | Dickman | Mar. 23, 1948 |
| 2,611,293 | Weiss | Sept. 23, 1952 |

FOREIGN PATENTS

| 293,454 | Germany | Nov. 18, 1913 |